US008140332B2

(12) United States Patent
Itoh et al.

(10) Patent No.: US 8,140,332 B2
(45) Date of Patent: Mar. 20, 2012

(54) TECHNIQUE FOR SEARCHING OUT NEW WORDS THAT SHOULD BE REGISTERED IN DICTIONARY FOR SPEECH PROCESSING

(75) Inventors: Nobuyasu Itoh, Yokohama (JP); Shinsuke Mori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/956,574

(22) Filed: Dec. 14, 2007

(65) Prior Publication Data

US 2008/0162118 A1    Jul. 3, 2008

(30) Foreign Application Priority Data

Dec. 15, 2006  (JP) .................................. 2006-338454

(51) Int. Cl.
    *G10L 15/04*    (2006.01)
    *G06F 17/21*    (2006.01)
    *G06F 17/27*    (2006.01)

(52) U.S. Cl. ............................... 704/251; 704/10; 704/9

(58) Field of Classification Search ................ 704/1–10, 704/251
    See application file for complete search history.

(56) References Cited

U.S. PATENT DOCUMENTS

| 5,029,084 A | * | 7/1991 | Morohasi et al. | .................. 704/9 |
| 5,835,635 A | * | 11/1998 | Nozaki et al. | .................. 382/226 |
| 5,867,812 A | * | 2/1999 | Sassano | .................. 704/10 |
| 6,173,251 B1 | * | 1/2001 | Ito et al. | .................. 704/7 |
| 6,173,252 B1 | * | 1/2001 | Qiu et al. | .................. 704/9 |

(Continued)

FOREIGN PATENT DOCUMENTS

JP    2004309753    11/2004
(Continued)

OTHER PUBLICATIONS

A. Wu et al., "Word Segmentation in Sentence Analysis," In Proceedings of the 1998 International Conference on Chinese Information Processing, Beijing, China (Nov. 18, 1998).*

(Continued)

*Primary Examiner* — James S. Wozniak
*Assistant Examiner* — Abdelali Serrou
(74) *Attorney, Agent, or Firm* — William Stock; Anne Vachon Dougherty

(57) ABSTRACT

To search out a new word that should be newly registered in a dictionary contained in a segmentation device for segmenting a text into words. This system inputs a training text into the segmentation device to cause the segmentation device to segment the training text into words, and thereby generates a plurality of segmentation candidates in association with certainty factors of the results of the segmentation, the segmentation candidates respectively containing mutually different combinations of words as results of the segmentation of the training text. Then, this system computes a likelihood that the each word is a new word by summing up some of the certainty factors that are respectively associated with some of the plurality of segmentation candidates that contain the each word. Then, from among combinations of words each contained in at least any one of the segmentation candidates, the system searches combinations of words contained in at least any one of the segmentation candidates and containing words with which the entire training text can be written, in order to find out a combination that minimizes an information entropy of words assuming that each word belonging to the combinations appears in the training text at a frequency according to the likelihood corresponding to the word, and thereafter for outputting the found-out combination as the combination of words including the new word.

5 Claims, 7 Drawing Sheets

U.S. PATENT DOCUMENTS

| | | | |
|---|---|---|---|
| 6,311,152 B1* | 10/2001 | Bai et al. | 704/9 |
| 6,363,342 B2* | 3/2002 | Shaw et al. | 704/220 |
| 6,374,210 B1* | 4/2002 | Chu | 704/9 |
| 6,626,960 B1* | 9/2003 | Gillam | 715/201 |
| 6,678,409 B1* | 1/2004 | Wu et al. | 382/177 |
| 6,772,120 B1* | 8/2004 | Moreno et al. | 704/256 |
| 6,973,427 B2* | 12/2005 | Hwang et al. | 704/249 |
| 7,107,207 B2* | 9/2006 | Goodman | 704/9 |
| 7,158,930 B2* | 1/2007 | Pentheroudakis et al. | 704/10 |
| 7,447,627 B2* | 11/2008 | Jessee et al. | 704/10 |
| 7,464,024 B2* | 12/2008 | Luo et al. | 704/9 |
| 7,533,019 B1* | 5/2009 | Hakkani-Tur et al. | 704/252 |
| 7,555,428 B1* | 6/2009 | Franz et al. | 704/10 |
| 7,562,010 B1* | 7/2009 | Gretter et al. | 704/9 |
| 7,610,189 B2* | 10/2009 | Mackie | 704/9 |
| 7,627,567 B2* | 12/2009 | Ganti et al. | 1/1 |
| 7,725,320 B2* | 5/2010 | Bennett | 704/255 |
| 2002/0082831 A1* | 6/2002 | Hwang et al. | 704/249 |
| 2003/0093263 A1* | 5/2003 | Chen et al. | 704/10 |
| 2005/0091031 A1* | 4/2005 | Powell et al. | 704/4 |
| 2005/0234906 A1* | 10/2005 | Ganti et al. | 707/5 |
| 2005/0251384 A1* | 11/2005 | Yang | 704/10 |

FOREIGN PATENT DOCUMENTS

| | | |
|---|---|---|
| JP | 2007171724 | 7/2007 |
| JP | 2000-075892 | 11/2009 |

OTHER PUBLICATIONS

C. Gdamiec et al., "Using Word Formation Rules to Extend MT Lexicons," 5.sup.th Conference of the Association for Machine Translation in the Americas, pp. 64-73 (Oct. 6, 12, 2002).*

A. Wu et al., "Statistically-Enhanced New Word Identification in a Rule-Based Chinese System," In Proceedings of the Second ACL Chinese Processing Workshop, HKUST, Hong Kong (2000).*

Brown etr al. "An Estimate of an Upper Bound for the Entropy of English", Published in: Journal Computational Linguistics archive, vol. 18 Issue 1, Mar. 1992, pp. 1-10.*

Mori et al. "A stochastic language model using dependency and its improvement by word clustering", Published in Proceeding COLING 1998 Proceedings of the 17th international conference on Computational linguistics—vol. 2, pp. 898-904.*

Kiyotaka Uchimoto, Satoshi Sekine, and Hitoshi Isahara, "The unknown word problem: a morphological analysis of Japanese using maximum entropy aided by a dictionary", In Proc. of EMNLP,2001, pp. 91-99.*

Chi, et al "Word segmentation and recognition for web document framework", ACM, Jan. 1999, pp. 458-465.*

Richard Sproat et al., "A Stochastic Finite-State Word-Segmentation Algorithm for Chinese," Computational Linguistics, vol. 22, No. 3, 1996, pp. 376-404.*

Itoh, et al, English abstract for "A Method for Segmenting Japanese Text into Words by Using N-gram Model", Research Report of Information Processing Society of Japan, NL-122, 1997.

* cited by examiner (b)

P1 = a1×a2×a3×a4
P2 = b1×b2×b3×b4
P3 = a1×c1×c2×c3×b3×a4
P4 = a1×c1×d1×d2×a4

| WORD | INFORMATION AMOUNT | LIKELIHOOD (APPEARANCE PROBABILITY) |
|---|---|---|
| ⋮ | ⋮ | ⋮ |
| SHINBOUSAI | 25.6 | X |
| ⋮ | ⋮ | ⋮ |
| SHIBOUSAIDOU | $4.4 \times 10^{-5}$ | Y |
| ⋮ | ⋮ | ⋮ |

FIG. 6

| WORD | INFORMATION AMOUNT | LIKELIHOOD (APPEARANCE PROBABILITY) |
|---|---|---|
| ⋮ | ⋮ | ⋮ |
| SHINSHITSUSAIDOU | 32.9 | Z |
| ⋮ | ⋮ | ⋮ |
| SHINSHITSU | 13.0 | W |
| ⋮ | ⋮ | ⋮ |
| SAIDOU | 7.4 | K |
| ⋮ | ⋮ | ⋮ |

FIG. 7

TECHNIQUE FOR SEARCHING OUT NEW WORDS THAT SHOULD BE REGISTERED IN DICTIONARY FOR SPEECH PROCESSING

FIELD OF THE INVENTION

The present invention relates to a technique for searching out a word. Particularly, the present invention relates to a technique for searching out a new word that should be registered in a dictionary for speech processing.

BACKGROUND OF THE INVENTION

In order to perform speech recognition and speech synthesis on a language, such as Japanese, where boundaries between words are not explicitly expressed, it is desirable that a text be correctly segmented into words. Additionally, in order to achieve highly accurate segmentation, it is desirable that various words be previously registered, in association with appearance frequencies of the respective words, in a dictionary in a segmentation device for dividing a text into words. Conventionally, a training text in which boundaries between words are made clear has been required in order to register a sufficient amount of words. However, such a training text needs to be manually constructed, and it has been difficult to secure the training text in sufficient volume.

On the other hand, techniques for enabling judgment on boundaries between words without having a training text in sufficient volume have been proposed. In one of these techniques, statistic information on a frequency at which a certain character and another character are continuously written in a word, the number of characters in a word and the like is computed previously from a training text, and the static information is used for making a determination on a word unregistered in a dictionary (refer to Mori et al., "An Estimate of an Upper Bound for the Entropy of Japanese," Journal of Information Processing Society of Japan, Vol. 38, No. 11, pp. 2191-2199 (1997); Nagata, "A Japanese Morphological Analysis Method Using a Statistical Language Model and an N-best Search Algorithm," Journal of Information Processing Society of Japan, Vol. 40, No. 9, pp. 3420-3431 (1999); Itoh et al., "A Method for Segmenting Japanese Text into Words by Using N-gram Model," Research Report of Information Processing Society of Japan, NL-122 (1997); Uchimoto, et al., "Morphological Analysis Based on A Maximum Entropy Model: An Approach to The Unknown Word Problem," Natural Language Processing, Vol. 8, No. 1, pp. 127-141 (2001); Asahara, and Matsumoto, "Unknown Word Identification in Japanese Text Based on Morphological Analysis and Chunking," Research Report of Information Processing Society of Japan, NL154-8, pp. 47-54 (2003)). In another proposed technique, computed is an index value indicating a likelihood that a certain inputted character string is a word (refer to Mori, and Nagao, "Unknown Word Extraction from Corpora Using n-gram Statistics," Journal of Information Processing Society of Japan, Vol. 39, No. 7, pp. 2093-2100 (1998); Yamamoto, M., and Church, K. W., "Using Suffix Arrays to Compute Term Frequency and Document Frequency for all Substrings in a Corpus," Computational Linguistics, Vol. 27, No. 1, pp. 1-30, (2001)). However, in any one of these techniques, when it is attempted to highly accurately make a determination on a word unregistered in a dictionary, a contradiction that sufficient information is required on properties of the word to be determined sometimes occurs. Additionally, in a case where information on an unregistered word is invariable, there is a tradeoff between the accuracy of detection and the number of words detectable as unregistered words, that is, the accuracy (precision) becomes more likely to decrease while an increase of the number of words, that is to say recall ratio is attempted.

SUMMARY OF THE INVENTION

Consequently, an object of the present invention is to provide a system, a method, and a program which are capable of solving the abovementioned problems. This object can be achieved by the combination of the characteristics described in the independent claims in the scope of claims. Additionally, the dependent claims define further advantageous specific examples of the present invention.

In order to solve the abovementioned problems, one aspect of the present invention is a system for searching out a new word that should be newly registered in a dictionary included in a segmentation device for segmenting an inputted text into a plurality of words. The system is characterized by including: a segmentation candidate generating unit for inputting a training text into the segmentation device to cause the segmentation device to segment the training text into words, thereby generating a plurality of segmentation candidates, which respectively contain mutually different combinations of words as results of the segmentation of the training text, in association with certainty factors of the results of the segmentation; a sum calculating unit for, with respect to each word, computing a likelihood that the each word is a new word by summing up the certainty factors respectively associated with the plurality of segmentation candidates that contain the each word; and a searching unit for, from among combinations of words each contained in at least any one of the segmentation candidates, searching combinations of words contained in at least any one of the segmentation candidates and containing words with which the entire training text can be written, in order to find out a combination that minimizes an information entropy of words assuming that each word belonging to the combinations appears in the training text at a frequency according to the likelihood corresponding to the word, and thereafter for outputting the found-out combination as the combination of words including the new word.

Additionally, a method for searching out a new word by means of the above system, and a program enabling an information processing system to function as the above system, are provided.

Note that not all of characteristics necessary for the present invention have been listed in the abovementioned summary of the present invention, and that a sub-combination of any groups formed by these characteristics can be an invention.

BRIEF DESCRIPTION OF THE DRAWINGS

For a more complete understanding of the present invention and the advantage thereof, reference is now made to the following description taken in conjunction with the accompanying drawings.

FIG. 6 shows a first example of words having been stored in the memory 210;

FIG. 7 shows a second example of words having been stored in the memory 210.

DETAILED DESCRIPTION OF THE PREFERRED EMBODIMENT

Although the present invention will be described below by way of an embodiment of the invention, the following embodiment does not limit the invention according to the scope of claims, and not every combination of characteristics described in the embodiment is essential for the solving means of the invention.

Figure 1:
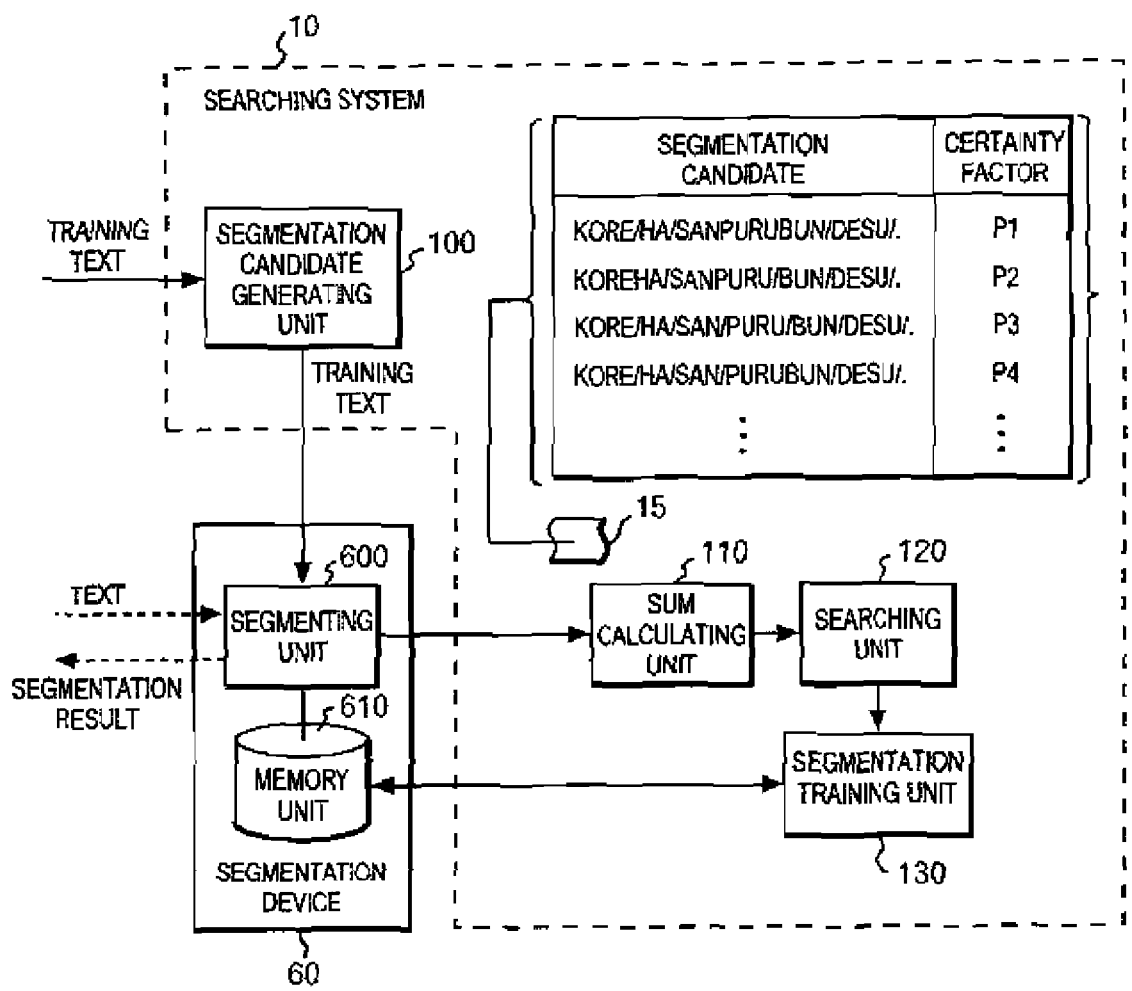
FIG. 1 shows an entire configuration of a searching system 10.

FIG. 1 shows an entire configuration of a searching system 10. The searching system 10 includes a segmentation candidate generating unit 100, a sum calculating unit 110, a searching unit 120, and a segmentation training unit 130, whereby the searching system 10 is intended for searching out a new word which is a word that should be newly registered in a dictionary included in a segmentation device 60. The segmentation candidate generating unit 100 acquires a training text from the outside, and inputs the training text into the segmentation device 60 to cause the segmentation device 60 to segment the training text into words. The segmentation device 60 includes: a memory unit 610 in which a dictionary used for segmenting a text into words has been stored; and a segmenting unit 600 which, using the dictionary, segments a text into words. Using the dictionary, the segmenting unit 600 segments the training text inputted from the segmentation candidate generating unit 100.

For example, in the dictionary stored in the memory unit 610, written expressions of words are recorded in association with appearance frequencies of the respective words. These appearance frequencies are supposed to be previously calculated in such a manner that the number of times of appearance of the respective words are counted from within a previously given text in enormous volume. In a case where a certain character string contained in the training text has been registered in the dictionary stored in the memory unit 610, the segmenting unit 600 judges the character string to be a word with a higher probability than in a case where the character string has not been registered in the dictionary. Additionally, even among words in the same registered state, a word having been registered in the dictionary in association with a higher appearance frequency is judged to be a word with a higher probability.

The segmenting unit 600 is configured to uniquely determine a result of the segmentation, and hence is configured to output the most likely result of segmenting an inputted text into a plurality of words out of a plurality of results of such segmentation according to the appearance frequencies recorded in the dictionary. However, in internal processing by which the most likely segmentation result is generated, the segmenting unit 600 sometimes generates a candidate for segmentation of the inputted text into a plurality of words although the candidate is not necessarily the most likely result of the segmentation result. The segmentation candidate generating unit 100 causes the segmentation device 60 to generate a plurality of such candidates for segmentation by instructing the segmentation device 60. Then, the segmentation candidate generating unit 100 causes the segmentation device 60 to generate the respective segmentation candidates in association with certainty factors of segmentation results thereof, and outputs the segmentation candidates and the certainty factors to the sum calculating unit 110. These segmentation candidates and these certainty factors are set as segmentation candidate data 15.

Note that it is desirable that, instead of outputting all of the plurality of generated segmentation candidates, the segmentation candidate generating unit 100 should select, from among the plurality of generated segmentation candidates, a predetermined number of segmentation candidates having the highest values of the certainty factors associated therewith, and output those selected candidates. This predetermined number can be arbitrarily set, and is 10 as an example. Furthermore, as another example, the segmentation candidate generating unit 100 may output some of the segmentation candidates by selecting them according to the certainty factors thereof, not according to the number thereof. For example, the segmentation candidate generating unit 100 may select, from among the plurality of generated segmentation candidates, some of the segmentation candidates that are associated with the certainty factors whose differences from the largest certainty factor are within a predetermined range, and output the selected segmentation candidates.

In the segmentation candidate data 15, the plurality of segmentation candidates respectively contain mutually different combinations of words as the segmentation results of the training text. For example, with respect to a training text which is written as "kore ha sanpuru bun desu (this is a sample text).", one of the segmentation candidates contains a combination of 5 words which are "kore", "ha", "sanpurubun", "desu" and ".". Another one of the segmentation candidates contains a combination of 5 words which are "koreha", "sanpuru", "bun", "desu" and ".". Here, a word means a unit of semantic analysis, and is not necessarily a word itself, a clause, or a phrase. In detail, a word is, for example, a unit formed of a character string decomposable not only into word classes in a grammatical sense, but also into word class groups of extensional word classes (for example, a postfixal expression for the end of a sentence, a punctuation mark itself, and the like) necessary for semantic analysis.

While being denoted in FIG. 1 as variables p1 to p4, the certainty factors associated with the respective segmentation candidates may actually be specific values, such as percentiles, for example, 50%, and index values, for example, frequency score 30. By summing up some of certainty factors that are associated with some of the segmentation candidates that contain each word, the sum calculating unit 110 calculates a likelihood that the each word is a new word. For example, because a word "kore" is contained in a first segmentation candidate, a third segmentation candidate, and a fourth segmentation candidate, (p1+p3+p4) obtained by summing up the certainty factors p1, p3, and p4 associated with these respective segmentation candidates is calculated as a likelihood that this word is a new word.

The searching unit 120 generates combinations of words, with words belonging to each of which the training text can be written, out of combinations of words contained in at least any one of the segmentation candidates. For example, with a combination composed of "kore", "koreha", "sanpurubun", "desu," and ".", a sentence "kore ha sanpuru bun desu." can be written without any character in the sentence being missed. On the other hand, a combination composed of "kore", "sanpurubun", "desu" and "." lacks a character string "ha", and hence is lacking in a word for writing therewith the sentence "kore ha sanpuru bun desu.". Thus, a combination of words, with words belonging to which the training text can be written, means a combination of words which is selected within the extent allowing overlaps of words and disallowing lacks of words.

Thereafter, from among the respective combinations of words having been thus generated, the searching unit 120 searches out a combination of words which minimizes an information entropy for a case where each word belonging to the combination is assumed to appear in the training text at a frequency according to a likelihood associated with the each word. For example, the word "kore" is actually contained in the first, third, and fourth segmentation candidates, that is, the word "kore" appears three times in total. However, in processing performed by the searching unit 120, it is assumed that the word "kore" appears at a frequency according to a likelihood (p1+p3+p4) calculated by the searching unit 120. A frequency according to a likelihood may be, for example, the likelihood itself, or may be a value proportional to the likelihood. As the value proportional to the likelihood, it is desirable to use, for example, a value normalized by setting a sum of the certainty factors associated with all of the generated segmentation candidates (that is, a sum of p1 to pn when assuming that there are n segmentation candidates) to 1. For one example of such computation, please refer to Nagata, "A Self-organizing Japanese Word Segmenter using Heuristic Word Identification and Re-estimation," Research Report of Information Processing Society of Japan, NL121, pp. 9-16 (1997).

In addition, an information entropy of words is a value computed, for example, by a formula shown as expression (1) below:

$$\overline{V} = \operatorname*{argmin}_{V' \subset V} H(V') = \operatorname*{argmin}_{V' \subset V} \sum_{w_i \in V'} -P(w_i) \operatorname{Log} P(w_i). \quad (1)$$

Here, V indicates a group of words each contained in at least any one of segmentation candidates. A variable having—(a bar) attached above V is a combination of words that should be found. V' is a variable in which a combination of words is temporarily stored in the process of finding a combination of words. H(V') indicates an information entropy of words contained in V', and argmin is an operator indicating that V' minimizing the information entropy should be found. The information entropy H(V') is found by: figuring out for each word ($w_i$) contained in V', a value found by multiplying, by −1, a product of $P(w_i)$, which is an appearance probability of the each word ($w_i$), and a logarithm of $P(w_i)$; and summing up these values for the respective words. The appearance probability $P(w_i)$ is, for example, found by normalizing values of the above-described frequencies so that a sum of appearance probabilities of all of words appearing in any one of the segmentation candidates can be 1, that is, the appearance probability $P(w_i)$ is calculated by dividing a corresponding value of the above described frequencies by a sum of the frequencies of the respective words.

A specific computation method is as follows. For example, the searching unit 120 compares all of the respective combinations of words, each contained in at least any one of the segmentation candidates, with the inputted training text, and selects, from among all of the combinations, combinations with which this training text can be written. Then, the searching unit 120 computes values of H(V') by substituting the thus selected combinations for V' in expression (1). Then, the searching unit 120 compares the respective calculated values of H (V'), searches out V' which gives the smallest value among these values, and sets this combination V' as the combination minimizing the information entropy. A computation time sometimes becomes too long in a case where the number of all of the combinations of words is enormous. Accordingly, another method will be described later with reference to FIG. 2 and the like.

The searching unit 120 outputs to the segmentation training unit 130, as a combination of words that contains a new word, the combination of words having been thus searched out. The segmentation training unit 130 increases an index value associated with each word contained in the combination of words that contains a new word in a case where the each word is already stored in the memory unit 610. In a case where that word is not stored in the memory unit 610, the segmentation training unit 130 newly registers the each word in the dictionary in the memory unit 610. Thereby, it becomes possible to increase the possibility that a new word searched out is judged correctly to be a word by the segmentation device 60.

Figure 2:
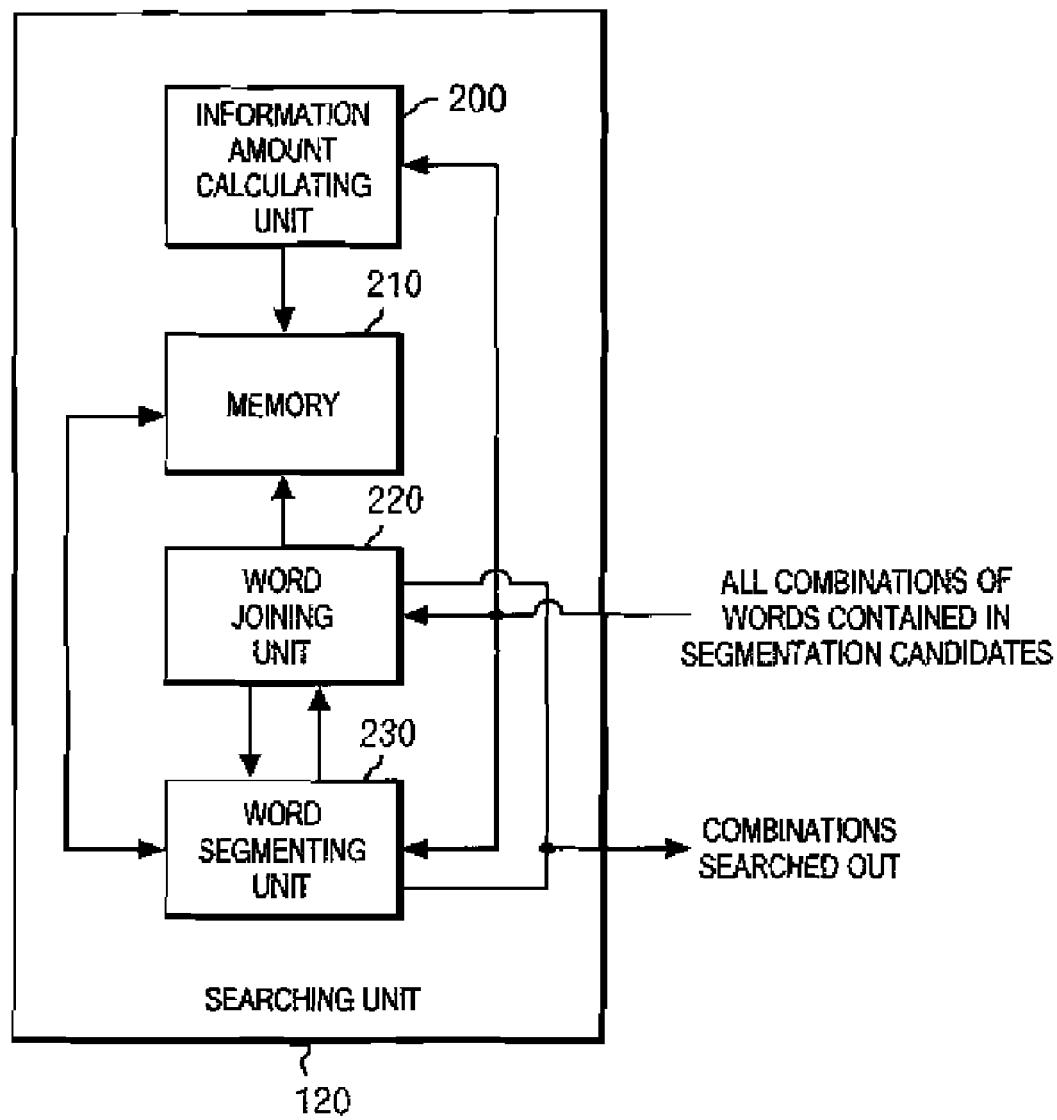
FIG. 2 shows a functional configuration of a searching unit 120.

FIG. 2 shows a functional structure of the searching unit 120. With reference to this drawing, description will be given of another processing performed in the case where a computation time becomes a problem since the number of all of the combinations of words is enormous in the above described processing for the information entropy. According to this processing, the combination of words that minimizes the information entropy can be searched out at higher speed in an approximating manner. The searching unit 120 includes an information amount calculating unit 200, a memory 210, a word joining unit 220, and a word segmenting unit 230. The information amount calculating unit 200 calculates an information amount of each word contained in at least any one of the segmentation candidates, assuming that the each word appears at a frequency according to a likelihood associated with the each word. Calculation processing of the information amount is expressed, for example, by expression (2) shown below:

$$I(w) = -\operatorname{Log}_2 P(w) \quad (2)$$

As shown in this expression, the information amount of each word w is calculated by multiplying, by −1, a logarithm having the base of 2 of P(w) which is an appearance probability according to a likelihood associated with the each word. The information amount calculating unit 200 stores the information amount thus calculated for each word in the memory 210. Additionally, a combination of words having been stored in the memory 210 is temporarily assumed to indicate the combination of words that should be searched out as the combination containing a new word. Furthermore, it is desirable that, in order to recompute the information amount when a plurality of words are joined together, or when a word is segmented into a plurality of words, in a later described processing function, the memory 210 should store the likelihoods calculated for all of the respective words by the sum calculating unit 110.

The word joining unit 220 compares with each other a first information amount calculated for a first word, and a second information amount which is an information amount of a second word containing a character string indicating the first word, the first word and second word being among words each contained in at least any one of the segmentation candidates. As a specific example of this processing, firstly, the word joining unit 220 accesses the memory 210 to search out the first word and the second word containing a character string indicating the first word. It is desirable that the first and second words that should be searched out have a mutual relation where a beginning or an ending of the first word matches the second word, that is, the first word be contained in any one of the beginning part and the ending part of the second word, not in the central part thereof. Then, the word joining unit 220 reads out from the memory 210 the first information amount corresponding to the first word having been searched out and the second information amount corresponding to the second word having been searched out. Then, the word joining unit 220 compares with each other the first and second information amounts having been read out.

Then, on condition that the second information amount is smaller than the first information amount, the word joining unit 220 excludes this first word from among words having been stored in the memory 210 as the combination of words which contains a new word. Additionally, in a case where the second word has not been stored, in the memory 210, as the combination of words which contains a new word, the word joining unit 220 adds the second word in the memory 210. However, because this embodiment assumes a premise that the memory 210 has all of the words stored therein from the beginning, it is not necessary to add the second word therein.

The word segmentation unit 230 searches out, from among the words contained in at least any one of the segmentation candidates, a third word, a fourth word, and a fifth word which is obtained by joining together a character string indicating the third word and a character string indicating the fourth word. The searching out of these words is achieved by scanning the memory 210. Then, the word segmentation unit 230 computes a sum of a third information amount calculated for the third word and a fourth information amount calculated for the fourth word, and compares this sum with a fifth information amount calculated for the fifth word. These respective information amounts can be found by searching the memory 210 for values of information amounts corresponding to these respective words.

Then, on condition that the sum of the third information amount and the fourth information amount is smaller than the fifth information amount, the word segmentation unit 230 excludes the fifth word from a combination of words which has been stored in the memory 210 as the combination of words which contains a new word. Additionally, in a case where the third and fourth words have not been stored in the memory 210 as the combinations of words which contain a new word, the word segmentation unit 230 adds the third and fourth words in the memory 210. For the same reason as has been described above, it is not necessary to add the third and fourth words therein in this embodiment.

Note that, while the case where the fifth word can be written by joining together two words, which are the third and fourth words, has been described here, the same is applied for the case where the fifth word can be written by joining together three or more words. In this case, a condition for excluding the fifth word is expressed as expression (3) shown below:

$$w_i = w^j_1 w^j_2 \ldots w^j_L, \quad (3)$$

and $$I(w_i) > \sum_k I(w^j_k)$$

Every time the processing is performed by any of the word joining unit 220 and the word segmentation unit 230, the information amount calculating unit 200 updates each processed word stored in the memory 210 by recomputing an information amount of the processed word. The searching unit 120 repeats the processing by the information amount calculating unit 200, the word joining unit 220, and the word segmentation unit 230 until contents of the memory 210 become unchanged by the processing. Then, the searching unit 120 outputs the contents of the memory 210 at the time when the contents have become unchanged.

Figure 3:
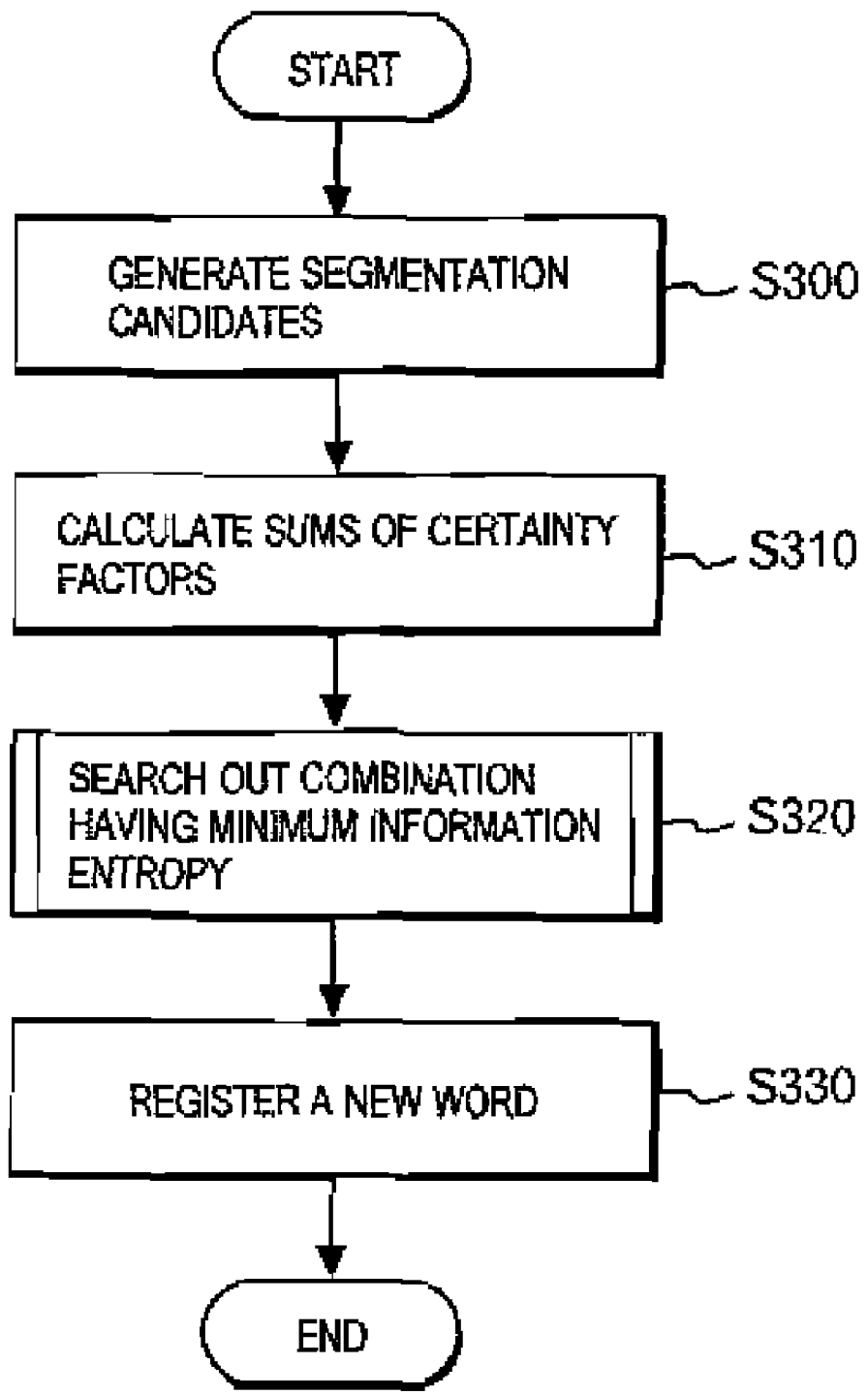
FIG. 3 shows a flow of the processing of searching for a new word by the searching system 10.
Figure 4:
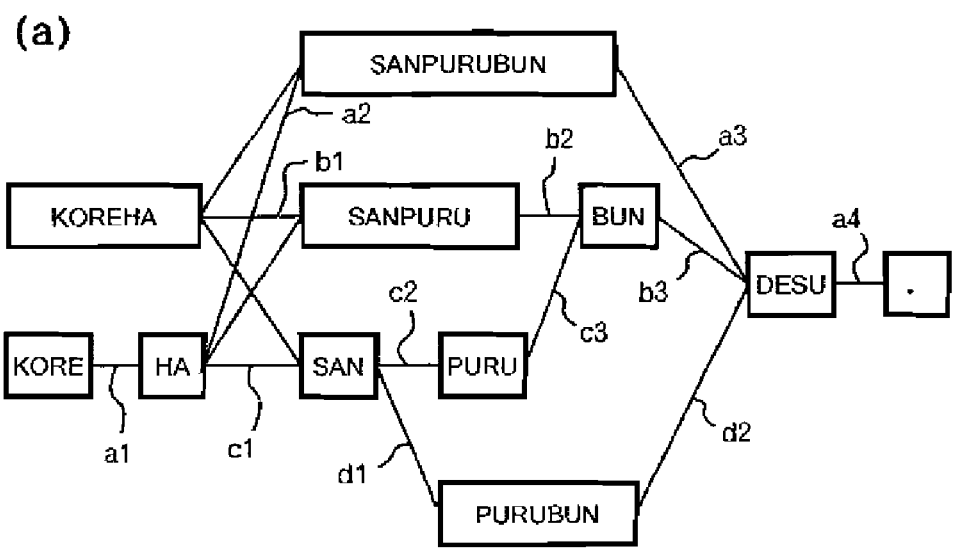
FIGS. 4A and 4B show one example of the processing of calculating certainty factors.

FIG. 3 shows a flow of processing of searching out a new word by means of the searching system 10. The segmentation candidate generating unit 100 instructs the segmentation device 60 to generate the plurality of segmentation candidates, each of which indicates a segmentation result of the training text, respectively associating with the certainty factors of the segmentation results (S300). The certainty factor can assume any form as long as it is an index value indicating a likelihood that the segmentation is certain, and a calculation method thereof depends on a technique adopted in the segmentation device 60. An example of the calculation method is shown in FIGS. 4A and 4B.

FIGS. 4A and 4B show an example of the processing of calculation of the certainty factors. In a technique called N-gram model, a value indicating an appearance frequency of each of combinations of n words continuously written in a text is previously stored. FIG. 4A schematically shows previously-stored frequencies with respect to a bi-gram model regarding combinations each formed of two words. In FIG. 4A, a frequency at which a word "ha" is continuously written next to a word "kore" is a1, a frequency at which a word "ha" and a word "sanpurubun" are continuously written is a2, and a frequency at which a word "sanpurubun" and a word "desu" are continuously written is a3.

Additionally, a frequency at which a word "." is continuously written next to a word "desu" is a4. Additionally, with respect to a character string "sanpurubun," a frequency at which this character string is written as a continuance of a word "sanpuru" and a word "bun" is b2, whereas frequencies at which the word "sanpuru" is written as a continuance of a word "san" and a word "puru", and at which a word "purubun" is written as a continuance of the word "puru" and a word "bun" are c2 and c3, respectively. In this manner, while information on the frequencies like these indicates frequencies at which words are continuously written, the information also indicates what manners of segmenting a given character string are likely. In addition, these frequencies are previously found by having a linguistic expert and the like judge and determine correct segments of words based on semantic analysis for a text in enormous volume.

Although searching out a new word as described in this embodiment is obviously unnecessary if frequencies as those described above have been previously given to all of combinations of words, it is not realistic to have the frequencies previously determined for all of the combinations of words. For this reason, the segmentation device 60 obtains a frequency of a combination of words to which a frequency has not been previously given by one of the following processes;
1. setting an extremely small predetermined frequency value,
2. calculating a frequency value based on previously-stored frequencies at each of which a character and a character are continuously written, or by performing the equivalent. The frequency values previously stored and the frequency values not previously stored but generated by the segmentation device 60 are a1 to a4, b1 to b3, c1 to c3, and d1.

Then, the segmentation unit 600 judges with what combination of these combinations of words to which the frequencies have been thus given the inputted training text can be written. For example, the segmentation unit 600 searches out, from the memory unit 610, words each corresponding to at least a part of the training text, and sets these words as nodes, whereby the segmentation unit 600 generates a graph where values of the frequencies stored in association with these respective words are set as edges. A graph having been thus generated is one in FIG. 4A. Then, the segmentation unit 600 multiplies the values of the frequencies corresponding to the respective edges in each route obtained by sequentially tracking this graph along the training text all the way from a foremost character string to a rearmost character string. This computation is shown in FIG. 4B.

For example, the segmentation unit 600 multiplies the frequencies a1 to a4 of respective edges on a route sequentially tracking "kore", "ha", "sanpurubun", "desu" and ".". A value thus calculated is a certainty factor p1 of this segmentation candidate. The same applies to each of the other routes. Because the frequencies b1, b2, b3, and a4 are associated with respective edges of one of the other routes, a value found by multiplying these frequencies is a certainty factor p2 of a segmentation candidate indicated by this route. The segmentation unit 600 selects the largest certainty factor out of certainty factors thus calculated for the respective routes, and outputs, as a segmentation result, a segmentation candidate indicated by a route corresponding to the largest certainty factor. The selection of the largest certainty factor can be achieved as high-speed processing, for example, by a conventional technique known as the Vitarbi algorithm (refer to Viterbi, A. J., "Error Bounds for Convolutional Codes and an Asymptotically Optimum Decoding Algorithm," IEEE Trans. on Information Theory, Vol. IT-13, No. 2, pp. 260-269, (1967)). Additionally, when outputting a plurality of segmentation candidates in response to an instruction from the segmentation candidate generating unit 100, the segmentation unit 600 outputs a plurality of segmentation candidates corresponding to a plurality of routes in the graph in association with certainty factors found by frequencies on these respective routes.

FIG. 3 will be referred to here again. Next, the sum calculating unit 110 sums up, for each word, certainty factors corresponding respectively to segmentation candidates each containing the each word, and sets a value found thereby as a likelihood that the word is a new word (S310). Then, from among combinations of words each contained in at least any one of the segmentation candidates, the searching unit 120 searches combinations of words contained in at least any one of the segmentation candidates and containing words with which the entire training text can be written, in order to find out a combination that minimizes an information entropy of words assuming that each word belonging to the combinations appears in the training text at a frequency according to the likelihood corresponding to the word, and thereafter for outputting the found-out combination as the combination of words including the new word (S320).

The searching unit 120 may use, instead of the information entropy, another index value including a property of the information entropy. This index value is, for example, one indicating a sum of a value indicating the information entropy, and a number of words belonging to the combination of words. Specifically, such index values have been known as MDL (Minimum Description Length), BIC (Baysian Information Criterion), and AIC (Akaike Information Criterion). By minimizing such an index value, the searching unit 120 can suppress the number of searched words to a small number while reducing the information entropy to some extent. Accordingly, when the combination of words which contains a new word has been searched out, searching unit 120 can prevent judgment as to which one out of words contained therein is a proper new word from becoming difficult because of too large the number of words contained therein even though the combination has been searched out. Then, next, the segmentation training unit 130 newly registers, in the memory unit 610, a word having been found by the searching unit 120 (S330).

Figure 5:
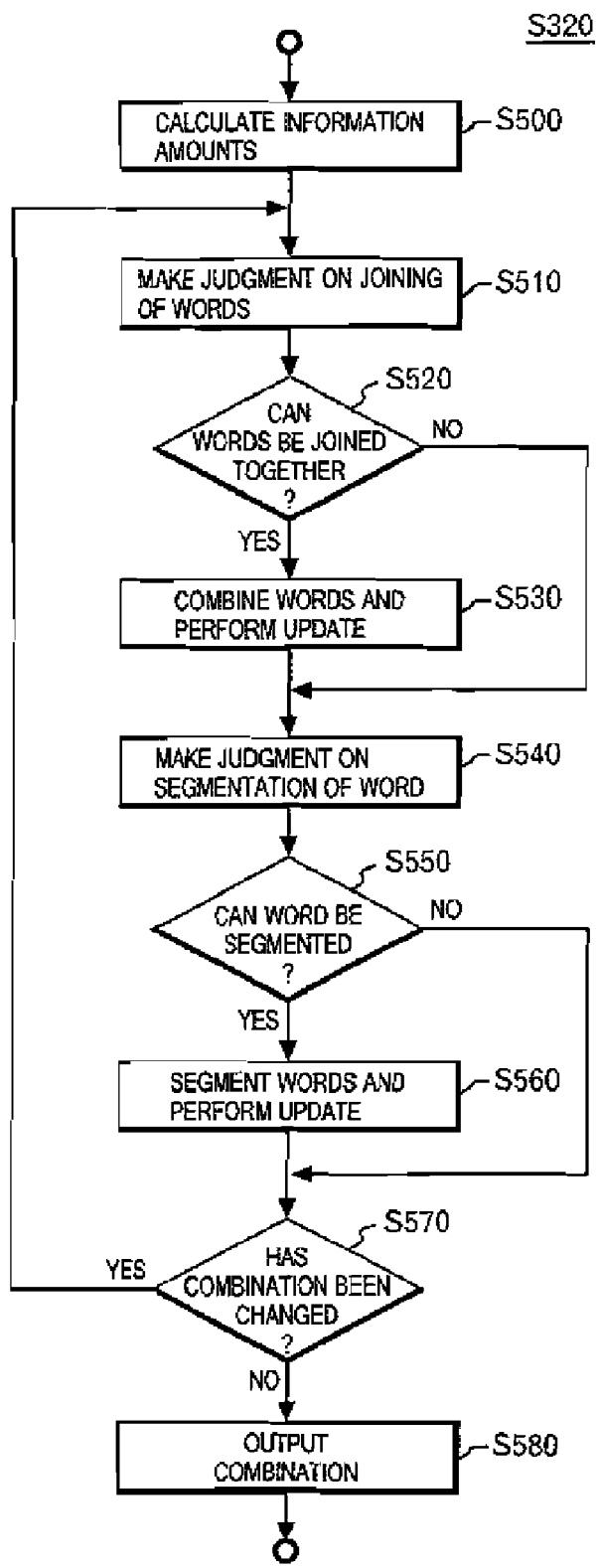
FIG. 5 shows details of the processing in S320.

FIG. 5 shows details of the processing in S320. The information amount calculating unit 200 calculates an information amount of each word contained in at least any one of the segmentation candidates for a case where the word is assumed to appear in the training text at a frequency according to a likelihood corresponding to the word. Then, the information amount calculating unit 200 stores a result of the calculation in the memory 210 (S500).

Next, the word joining unit 220 judges, using this calculated information amount, whether or not there are any words which should be joined together as one word because, although they normally should be recognized as one word, they have been recognized as two words (S510). Specifically, with respect to a first word and a second word which are found among words each contained in at least any one of the segmentation candidates, the word joining unit 220 excludes this first word from the memory 210 (S530) on condition that a second information amount, which is an information amount of the second word, is smaller than a first information amount calculated for the first word (YES in S520), the second word containing a character string indicating the first word. One example of the processing of this exclusion will be described with reference to FIG. 6.

FIG. 6 shows a first example of words stored in the memory 210. In FIG. 6, the memory 210 has "shinbousai", which is one example of the first word, stored therein in association with an information amount thereof of 25.6, and has "shinbousaidou", which is one example of the second word, stored therein in association with an information amount thereof of $4.4 \times 10^{-5}$. Additionally, the memory 210 has likelihoods, which have been calculated by the sum calculation unit 110 with respect to these respective words, stored therein. The memory 210 may have appearance probabilities of the respective words, instead of the likelihoods thereof, stored therein, the appearance probabilities having been respectively calculated using these likelihoods. Note that these words are those having been obtained by inputting some medical report as the training text. Because "saidou" is used as a word which is one continuous meaningful word in a certain professional field, it is considered disadvantageous in terms of semantic analysis that "sai" which is a part of "saidou" forms a word denoting "shinbousai" by being joined with "shinbou" meaning a partial organ of a heart.

The word joining unit 220 judges that "shinbousai" which is the first word is contained in "shinbousaidou" which is the second word, and also, that $4.4 \times 10^{-5}$ which is the second information amount is smaller than 25.5 which is the first information amount. This indicates that "shinbousaidou" appears in the segmentation candidates at an extremely higher frequency than "shinbousai" does. In this case, the word joining unit 220 excludes, from the memory 210, "shinbousai" which is the first word. Furthermore, by regarding a new likelihood of this "shinbousaidou" as a sum of the likelihood of "shinbousai" and the current likelihood of "shinbousaidou", the word joining unit 220 newly calculates an information amount of "shibousaidou", and updates the second information amount having been stored in the memory 210. Specifically, the new likelihood of "shinbousaidou" becomes a sum of the likelihood X having been stored in association with "shinbousai" and the current likelihood Y having been stored in association with "shinbousaidou". The second information amount is recomputed based on this new likelihood.

In a manner as described above, according to the word joining unit 220, a group of words which normally should be joined together as one word but have been segmented into a plurality of words can be judged as one word.

FIG. 3 will be referred to here again. Next, the word segmenting unit 230 judges whether or not there is any word which should be segmented into two words since, although that word normally should be recognized as two words, the word has been recognized as one word (S540). Specifically, the word segmenting unit 230 searches out, from among words each contained in at least any one of the segmentation candidates, a third word, a fourth word, and a fifth word which is written by joining together character strings respectively indicating the third word and the fourth word, and then excludes the fifth word from the memory 210 (S560) on condition that a sum of a third information amount calculated for the third word and a fourth information amount calculated for the fourth word is smaller than a fifth information amount calculated for the fifth word (S550). One example of processing of this exclusion will be described with reference to FIG. 7.

FIG. 7 shows a second example of words stored in the memory 210. In FIG. 6, the memory 210 has "shinshitsu", which is one example of the third word, stored therein in association with an information amount thereof of 13, has "saidou", which is one example of the fourth word, stored therein in association with an information amount thereof of 7.4, and has "shinshitusaidou", which is one example of the fifth word, stored therein in association with an information amount thereof of 32.9. Additionally, the memory 210 has likelihoods Z, W, and K, which have been respectively calculated by the sum calculation unit 110 with respect to the third word, the fourth word, and the fifth word, stored therein in association with these respective words. Because these words "shinshitsu" and "saidou" are each considered as having an independent meaning by itself, it is considered disadvantageous in terms of semantic analysis that these words are recognized as the word "shinsitsusaidou" in which they are joined together.

With respect to these respective words, the word segmenting unit 230 judges that 20.4 obtained by summing up 13 and 7.4 which are the third information amount of "shinshitsu" and the fourth information amount of "saidou", respectively, is smaller than 32.9 which is the fifth information amount calculated for "shinshitusaidou" which is a joint of "shinshitsu" and "saidou". This indicates that frequencies at which writings "shinshitsu" and "saido" independently appear are higher than a frequency at which one continuous writing written as "shinshitsusaidou" appears. In this case, the word segmenting unit 230 excludes, from the memory 210, "shinshitsusaidou", which is the fifth word.

Furthermore, by regarding a new likelihood of "shinshitsu" as a sum of the current likelihood of "shinshitsu" and the likelihood of "shinshitsusaidou", the word segmenting unit 230 newly calculates an information amount of "shinshitsu", and updates the third information amount having been stored in the memory 210. Specifically, the new likelihood of "shinshitsu" becomes a sum of the likelihood W having been stored in association with "shinshitsu" and the likelihood Z having been stored in association with "shinshitsusaidou". The third information amount is recomputed using this new likelihood.

Also with respect to the word "saidou", by regarding a new likelihood of "saidou" as a sum of the current likelihood of "saidou" and the likelihood of "shinshitsusaidou", the word segmenting unit 230 newly calculates an information amount of "saidou", and updates the fourth information amount having been stored in the memory 210. Specifically, the new likelihood of "saidou" becomes a sum of the likelihood K having been stored in association with "saidou" and the likelihood Z having been stored in association with "shinshitsusaidou". The fourth information amount is recomputed using this new likelihood.

In a manner as described above, according to the word segmenting unit 230, a word which should be treated as separated independent words in terms of semantic analysis but has been recognized as one word can be judged as a plurality of words.

FIG. 3 will be referred to here again. The searching unit 120 judges whether or not contents having been stored in the memory 210 have been changed by the above-described processing (S570). This means that the processing performed by the word joining unit 220 and the processing performed by the word segmenting unit 230 have converged, that is, this means that any more word that should be excluded from or added to the combination of words which contains a new word cannot be searched out from among words each contained in at least any one of the segmentation candidates having been generated by the segmentation candidate generating unit 100. Until such a word cannot be searched out any more, the searching unit 120 causes the processing to return to S510, and causes the processing performed by the word joining unit 220 and the processing performed by the word segmenting unit 230 to be repeated alternately. On this occasion, the word joining unit 220 and the word segmenting unit 230 sequentially judges whether words should be added or excluded by using updated information amounts having been stored in the memory 210. On condition that any more word that should be excluded from or added cannot be searched out (NO in S570), the searching unit 120 outputs the combination of words containing a new word (S580).

Figure 8:
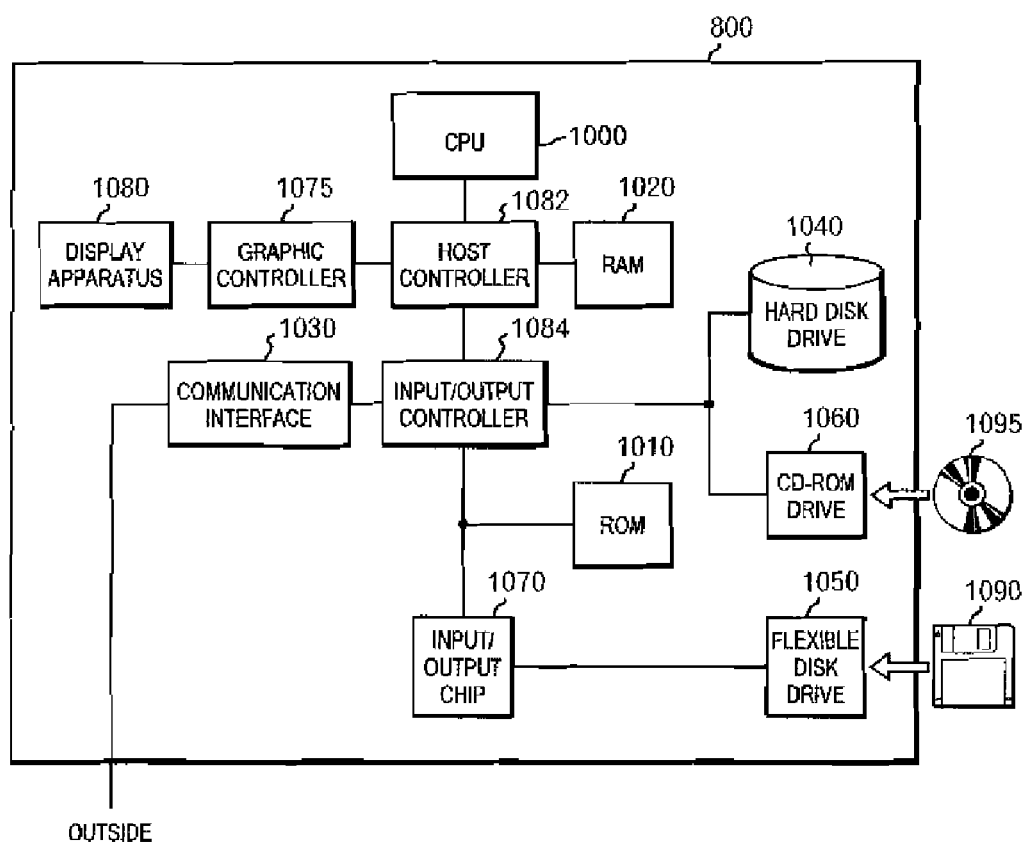
FIG. 8 shows one example of a hardware configuration of an information processing apparatus 800 functioning as the searching system 10.

FIG. 8 shows one example of a hardware configuration of an information processing apparatus 800 functioning as the searching system 10. The information processing apparatus 800 includes: a CPU peripheral section having a CPU 1000, a RAM 1020, and a graphic controller 1075 which are mutually connected by a host controller 1082; an input/output section having a communication interface 1030, a hard disk drive 1040, and a CD-ROM drive 1060 which are connected to the host controller 1082 by an input/output controller 1084; and a legacy input/output section having a ROM 1010, a flexible disk drive 1050, and an input/output chip 1070 which are connected to the input/output controller 1084.

The host controller 1082 connects the RAM 1020 with the CPU 1000 and the graphic controller 1075 which access the RAM 1020 at high transfer rates. The CPU 1000 operates according to programs stored in the ROM 1010 and RAM 1020, and thereby performs control over the respective sections. The graphic controller 1075 acquires image data generated by the CPU 1000 or the like on a frame buffer provided in the RAM 1020, and displays the image data on a display apparatus 1080. Instead of this, the graphic controller 1075 may include, inside itself, a frame buffer in which the image data generated by the CPU 1000 or the like is stored.

The input/output controller 1084 connects the host controller 1082 with the communication interface 1030, the hard disk drive 1040, and the CD-ROM drive 1060 which are relatively high-speed input/output devices. The communication interface 1030 communicates with an external apparatus through a network. The hard disk drive 1040 stores therein programs and data which are used by the information processing apparatus 800. The CD-ROM drive 1060 reads out any one of a program and data from a CD-ROM 1095, and provides any one of the program and data to the RAM 1520 or the hard disk drive 1540.

Additionally, the ROM 1010, and relatively low-speed input/output devices, such as the flexible disk drive 1050 and the input/output chip 1070, are connected to the input/output controller 1084. The ROM 1010 stores therein: a boot program executed by the CPU 1000 at the startup of the information processing apparatus 800; and other programs dependent on the hardware of the information processing apparatus 800; and the like. The flexible disk drive 1050 reads out any one of programs and data from a flexible disk 1090, and provides anyone of the programs or data to the RAM 1020 or to the hard disk drive 1040 through the input/output chip 1070. The input/output chip 1070 connects, to the CPU 1000, the flexible disk 1090, and various kinds of input/output devices through, for example, a parallel port, a serial port, a keyboard port, a mouse port, and the like.

A program provided to the information processing apparatus 800 is provided by a user in a state stored in a recording medium, such as the flexible disk 1090, the CD-ROM 1095, and an IC card. The program is executed after being read out from the recording medium through at least any one of the input/output chip 1070 and the input/output controller 1084, and then being installed into the information processing apparatus 800. Description on operations which the program causes the information processing apparatus 800 to perform will be skipped since these operations are identical to those in the searching apparatus 10 which have been described in connection with FIGS. 1 to 7.

The program described above may be stored in an external recording medium. As the recording medium, apart from the flexible disk 1090 and the CD-ROM 1095, it is possible to use: an optical recording medium, such as a DVD and a PD; a magneto optical recording medium, such as an MD; a tape medium; a semiconductor memory, such as an IC card; and the like. Additionally, it is also possible to provide the program to the information processing apparatus 800 through a network by using, as the recording medium, a recording device, such as a hard disk and a RAM, provided in a server system connected to a private communication network or Internet.

As has been described above, according to the searching system 10 according to this embodiment, a new word that should be newly registered in the dictionary can be highly accurately searched out for a segmentation device for segmenting a given text into words. On this occasion, cost and time required for registering a new word can be reduced from those in a conventional case since a text having been previously generated by a linguistic expert and the like, and having boundaries between words given thereto is not required. Such reduction in cost and time is advantageous particularly in constructing a dictionary in specific fields. For example, a dictionary for word segmentation in the standard language can be relatively easily constructed since it is easy to obtain, relatively inexpensively and in enormous volume, a text for which analysis has been completed with respect to the standard language. However, it is sometimes difficult to highly accurately segment into words a text in a specific technical field or a specific purpose, even by using such a dictionary. On the other hand, for such a specific field, because so much time and cost cannot be spent due to a small demand for word segmentation, and also because a volume of texts is small first of all, it is difficult to prepare, in sufficient volume, a text for which analysis by an expert has been completed. The searching system 10 according to this embodiment can highly accurately and highly efficiently search out a new word, and thereby enhance accuracy of word segmentation, with respect to a text in such a specific field, even with a relatively small cost.

Additionally, all that is required for the segmentation device to which this embodiment is applied is to have a function of outputting results of the segmentation in association with certainty degrees thereof, and this embodiment can enable various segmentation devices adopting various methods to register new words. Furthermore, searching out a new word can be processed at high speed, and be thereby completed in a realistic time period by adopting the approximating manner for minimization of the information entropy. Additionally, word segmentation can be applied to various techniques, such as speech synthesis and speech recognition, and enhancement in accuracy of word segmentation can lead to realization of enhancement in recognition accuracy of speech, and enhancement in quality of synthesized speech.

As a result of performing an experiment using the searching system 10 according to this embodiment, various experimental results indicating usefulness thereof were obtained. For example, as compared to a dictionary generated by a conventional method, a dictionary in which new words were sequentially registered by the searching system 10 was able to considerably improve a covering rate of a vocabulary in a certain experimental text. In other words, it was confirmed thereby that accuracy in segmenting a text into words is enhanced. Additionally, as compared to a case where a expert manually analyzed a text, a vocabulary registered in a dictionary in which new words were sequentially registered by the searching system 10 had words the number of which is larger by about 10% than the number of words analyzed in that case, the vocabulary being capable of expressing a text of the same level. In other words, it was also confirmed thereby that the number of new words incorrectly searched out is small, and that accuracy in searching is high. Additionally, as a result of actually applying the searching system 10 according to this embodiment to a system (refer to Nagano et al, "An N-gram-based Approach to Phoneme and Accent Estimation for TTS," Journal of Information Processing Society of Japan, Vol. 47, No. 6 (2006)) for recognizing a reading of an inputted text, it was also confirmed that a recognition rate of the system is very high.

While the present invention has been described hereinabove by using the embodiment, a technical scope of the present invention is not limited to the scope described in the abovementioned embodiment. It is apparent to those skilled in the art that various modifications or improvements can be made to the abovementioned embodiment. It is apparent from the scope of claims that embodiments to which such modifications or improvements have been made can also be included in the technical scope of the present invention.

Although the preferred embodiment of the present invention has been described in detail, it should be understood that various changes, substitutions and alternations can be made therein without departing from spirit and scope of the inventions as defined by the appended claims.

What is claimed is:

1. A system for automatically searching out a new word to be newly registered in a dictionary included in a segmentation device for segmenting an inputted text into a plurality of words, the system comprising:

a computer processing device for executing unit, including at least a segmentation candidate generating unit, a sum calculating unit and a search unit;

the a segmentation candidate generating unit for generating a plurality of segmentation candidates by inputting a training text into the segmentation device to cause the segmentation device to segment the training text into words, the segmentation candidates containing mutually different combinations of words resulting from the segmentation of the training text, and being associated with certainty factors of the results of the segmentation;

the a sum calculating unit for computing a likelihood that each word is a new word by summing up the certainty factors associated with the plurality of segmentation candidates containing the word; and the a searching unit for searching combinations of words contained in at least any one of the segmentation candidates and containing words with which the entire training text can be written, in order to find out a combination that minimizes an information entropy of words assuming that each word belonging to the combinations appears in the training text at a frequency according to the likelihood corresponding to the word, and thereafter for outputting the found-out combination as the combination of words including the new word;

wherein the searching unit comprises:

an information amount calculating unit which calculates an information amount of each word assuming that the word appears at a frequency according to the likelihood corresponding to the word;

a word joining unit which excludes a first word from, and adds a second word, to the combination of words containing the new word, the first word contained in at least any one of the segmentation candidates, and the second word being a character string containing the first word, on condition that a second information amount calculated for the second word is smaller than a first information amount calculated for the first word; and a word segmenting unit which excludes a fifth word from and adds third and fourth words to the combination of words containing the new word, the third and fourth words contained in at least any one of the segmentation candidates, and the fifth word being a character string obtained by joining a character string of the third word and a character string of the fourth word, on condition that a sum of a third information amount calculated for the third word and a fourth information amount calculated for the fourth word is smaller than a fifth information amount calculated for the fifth word, wherein the searching unit causes the word joining unit and the word segmenting unit to perform the processing repeatedly and alternately until any more word that should be excluded from or added to the combination of words containing the new word cannot be searched out among the words contained in at least any one of the segmentation candidates, and the searching unit outputs the combination of words on condition that any word that should be excluded or added cannot be found thereamong, wherein the information amount calculating unit stores in the memory an information amount calculated for each word, on conditions that the word joining unit excludes the first word and adds the second word, the information amount calculating unit calculates an information amount of the second word assuming that a new likelihood of the second word is a sum of the likelihood of the first word and the current likelihood of the second word, and updates the second information amount stored in the memory, on conditions that the word segmenting unit excludes the fifth word and adds the third and fourth words, the information amount calculating unit calculates information amounts of the third word and the fourth word, assuming that a new likelihood of the third word is a sum of the current likelihood of the third word and the likelihood of the fifth word, and that a new likelihood of the fourth word is a sum of the current likelihood of the fourth word and the likelihood of the fifth word, and updates the third and fourth information amounts, and the word joining unit and the word segmenting unit judge whether a word should be excluded or added by using the updated information amounts having been stored in the memory.

2. The system according to claim 1, further comprising a segmentation training unit, wherein:

the segmentation device includes a memory unit in which an index value for each word and another word written in a manner continuous with the former word is stored, the index value indicating a frequency at which the former word and the latter word are written in a manner continuous with each other, and generates the plurality of segmentation candidates according to the frequencies; and the segmentation training unit increases an index value corresponding to a word contained in the combination of words containing the new word and searched out by the searching unit when this searched-out word is stored in the memory unit, and newly registers this searched-out word in the memory unit when this searched-out word is not stored in the memory unit.

3. The system according to claim 1, wherein the searching unit searches combinations of words contained in at least any one of the segmentation candidates to find out a combination of words minimizing a sum of a value of the information entropy and an index value of a predetermined index which increases as the number of words belonging to the combination increases.

4. A method of searching out a new word that should be newly registered in a dictionary included in a segmentation device for segmenting an inputted text into a plurality of words, the method comprising the steps of:

generating a plurality of segmentation candidates by inputting a training text into the segmentation device to cause the segmentation device to segment the training text into words, the segmentation candidates containing mutually different combinations of words resulting from the segmentation of the training text, and being associated with certainty factors of the results of the segmentation;

computing a likelihood that each word is a new word by summing up some of the certainty factors associated with some of the plurality of segmentation candidates containing the word;

searching combinations of words each contained in at least any one of the segmentation candidates and containing words with which the entire training text can be written, in order to find out a combination that minimizes an information entropy of words, assuming that each word belonging to the combinations appears in the training text at a frequency according to the likelihood corresponding to the word; and outputting the found-out combination as the combination of words including the new word, wherein the searching comprises:

calculating an information amount of each word assuming that the word appears at a frequency according to the likelihood corresponding to the word;

excluding a first word from, and adding a second word, to the combination of words containing the new word, the first word contained in at least any one of the segmentation candidates, and the second word being a character string containing the first word, on condition that a second information amount calculated for the second word is smaller than a first information amount calculated for the first word; and excluding a fifth word from and adding third and fourth words to the combination of words containing the new word, the third and fourth words contained in at least any one of the segmentation candidates, and the fifth word being a character string obtained by joining a character string of the third word and a character string of the fourth word, on condition that a sum of a third information amount calculated for the third word and a fourth information amount calculated for the fourth word is smaller than a fifth information amount calculated for the fifth word, wherein the searching causes the excluding and adding repeatedly and alternately until any more word that should be excluded from or added to the combination of words containing the new word cannot be searched out among the words contained in at least any one of the segmentation candidates, and outputting the combination of words on condition that any word that should be excluded or added cannot be found thereamong, further comprising storing in a memory an information amount calculated for each word, on conditions that the first word is excluded and the second word is added, calculating an information amount of the second word assuming that a new likelihood of the second word is a sum of the likelihood of the first word and the current likelihood of the second word, and updates the second information amount stored in the memory, on conditions that the fifth word is excluded and the third and fourth words are added, calculating information amounts of the third word and the fourth word, assuming that a new likelihood of the third word is a sum of the current likelihood of the third word and the likelihood of the fifth word, and that a new likelihood of the fourth word is a sum of the current likelihood of the fourth word and the likelihood of the fifth word, and updates the third and fourth information amounts, and judging whether a word should be excluded or added by using the updated information amounts having been stored in the memory.

5. A non-transitory computer storage medium storing a program for enabling an information processing system to function as a system for searching out a new word that should be newly registered in a dictionary included in a segmentation device for segmenting an inputted text into a plurality of words, the program causing the information system to function as:

a segmentation candidate generating unit for generating a plurality of segmentation candidates by inputting a training text into the segmentation device to cause the segmentation device to segment the training text into words, the segmentation candidates containing mutually different combinations of words resulting from the segmentation of the training text, and being associated with certainty factors of the results of the segmentation;

a sum calculating unit for computing a likelihood that each word is a new word by summing up some of the certainty factors associated with some of the plurality of segmentation candidates containing the word; and a searching unit for searching combinations of words contained in at least any one of the segmentation candidates and containing words with which the entire training text can be written, in order to find out a combination that minimizes an information entropy of words assuming that each word belonging to the combinations appears in the training text at a frequency according to the likelihood corresponding to the word, and thereafter for outputting the found-out combination as the combination of words including the new word, wherein the searching unit comprises:

an information amount calculating unit which calculates an information amount of each word assuming that the word appears at a frequency according to the likelihood corresponding to the word;

a word joining unit which excludes a first word from, and adds a second word, to the combination of words containing the new word, the first word contained in at least any one of the segmentation candidates, and the second word being a character string containing the first word, on condition that a second information amount calculated for the second word is smaller than a first information amount calculated for the first word; and a word segmenting unit which excludes a fifth word from and adds third and fourth words to the combination of words containing the new word, the third and fourth words contained in at least any one of the segmentation candidates, and the fifth word being a character string obtained by joining a character string of the third word and a character string of the fourth word, on condition that a sum of a third information amount calculated for the third word and a fourth information amount calculated for the fourth word is smaller than a fifth information amount calculated for the fifth word, wherein the searching unit causes the word joining unit and the word segmenting unit to perform the processing repeatedly and alternately until any more word that should be excluded from or added to the combination of words containing the new word cannot be searched out among the words contained in at least any one of the segmentation candidates, and the searching unit outputs the combination of words on condition that any word that should be excluded or added cannot be found thereamong, wherein the information amount calculating unit stores in the memory an information amount calculated for each word, on conditions that the word joining unit excludes the first word and adds the second word, the information amount calculating unit calculates an information amount of the second word assuming that a new likelihood of the second word is a sum of the likelihood of the first word and the current likelihood of the second word, and updates the second information amount stored in the memory, on conditions that the word segmenting unit excludes the fifth word and adds the third and fourth words, the information amount calculating unit calculates information amounts of the third word and the fourth word, assuming that a new likelihood of the third word is a sum of the current likelihood of the third word and the likelihood of the fifth word, and that a new likelihood of the fourth word is a sum of the current likelihood of the fourth word and the likelihood of the fifth word, and updates the third and fourth information amounts, and the word joining unit and the word segmenting unit judge whether a word should be excluded or added by using the updated information amounts having been stored in the memory.

\* \* \* \* \*